US007010701B1

(12) United States Patent
Bossemeyer, Jr. et al.

(10) Patent No.: US 7,010,701 B1
(45) Date of Patent: Mar. 7, 2006

(54) NETWORK ARRANGEMENT FOR SMART CARD APPLICATIONS

(75) Inventors: Robert Wesley Bossemeyer, Jr., St. Charles, IL (US); Edmond W. Israelski, Lake Barrington, IL (US); Wayne Robert Heinmiller, Elgin, IL (US); Jordan Howard Light, Chicago, IL (US); Gayle Roberta Ekstrom, Chicago, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 09/420,877

(22) Filed: Oct. 19, 1999

(51) Int. Cl.
*H04L 9/00* (2006.01)

(52) U.S. Cl. ....................... 713/201; 711/173; 455/558

(58) Field of Classification Search ........ 713/200–202; 705/2; 711/115, 173, 209; 707/1; 725/6, 725/4; 709/229, 217; 455/558
See application file for complete search history.

(56) References Cited

U.S. PATENT DOCUMENTS 5,191,611 A 3/1993 Lang
5,530,232 A 6/1996 Taylor
5,566,327 A 10/1996 Sehr
5,578,808 A 11/1996 Taylor
5,586,171 A 12/1996 McAllister et al.
5,613,012 A 3/1997 Hoffman et al.
5,729,594 A 3/1998 Klingman
5,742,845 A 4/1998 Wagner
5,745,554 A 4/1998 Rozetti
5,765,211 A * 6/1998 Luck .......................... 711/209
6,038,551 A * 3/2000 Barlow et al. ................ 705/41
6,041,412 A * 3/2000 Timson et al. .............. 713/200
6,192,349 B1 * 2/2001 Husemann et al. ........... 705/65
6,226,744 B1 * 5/2001 Murphy et al. ............. 713/200
6,415,160 B1 * 7/2002 Wichmann .................. 455/558
6,480,935 B1 * 11/2002 Carper et al. ............... 711/115
6,643,690 B1 * 11/2003 Duursma et al. ........... 709/217
6,769,053 B1 * 7/2004 De Jong et al. ............ 711/156

OTHER PUBLICATIONS

Smart Card Logon, Jun. 22, 1999.*

* cited by examiner

*Primary Examiner*—Kim Vu
*Assistant Examiner*—Thanhnga B. Truong
(74) *Attorney, Agent, or Firm*—Toler, Larson & Abel LLP

(57) ABSTRACT

A network for smart card applications using a smart card in combination with a smart card terminal. The network arrangement includes a communications network connected to at least one smart card terminal, and a central database server in operative communication with the network central office. The network central office is part of the public switched telephone network and transmits smart card data between the smart card terminal and central database server. The central database server includes many partitioned memory locations each containing information associated with a smart card application. The information contained in the partitioned memory locations is accessible by data pointers stored on the individual smart cards. In this manner, the amount of data stored on the smart cards using the system is reduced and all of the information relating to a smart card user is centralized in one location. The central database server includes means for distinguishing between public information and proprietary information stored in the partitioned memory locations.

11 Claims, 3 Drawing Sheets

NETWORK ARRANGEMENT FOR SMART CARD APPLICATIONS

BACKGROUND OF THE INVENTIONS

1. Technical Field

This invention relates to smart card applications and, more particularly, to a network arrangement to provide access to an architecture that supports a variety of advanced smart card applications.

2. Background Art

The present telephone network including the copper, fiber optic, and wireless communications infrastructure, provides a potential robust architecture for data card or smart card applications.

The term "data card" as used herein includes financial cards such as credit cards, debit cards, ATM cards, as well as non-financial data cards such as energy company cards, department store cards, car rental cards, hotel cards and airline cards. Data cards can also include driver's licenses, building security cards, and personal identification cards. Data cards commonly have a magnetic strip containing a limited amount of read-only data. Such data cards are very common and most people carry numerous cards to function in modern society.

Partly due to the number and types of data cards, substitute, replacement, or consolidation cards have been developed allowing multiple card issuers to be represented with a single data card, thereby allowing consumers to carry just one card for several types of transactions including those identified above. Such cards have been referred to as "smart" cards. The magnetic-striped data cards, which are in general use, have limited capabilities. Smart cards, however, differ from data cards in that they can hold much more information and often include some "intelligence" such as a microprocessor or the like.

While much prior work is focused on the design of smart cards, smart card readers, and applications for smart cards, there has been much less focus on the integration of a centralized server architecture or a network arrangement for multiple smart card applications.

In this regard, the present invention describes a network arrangement which is readily accessible from different types of smart card terminals supporting various smart card applications. The network connections are facilitated by the present telephone network or an interconnected network of computers such as the Internet. With a centralized server architecture, data related to an individual can be accessed by an individual smart card, predefined groups of smart card users, or the general public.

BRIEF DESCRIPTION OF THE DRAWINGS

For a more complete understanding of this invention, reference should now be made to the embodiment(s) illustrated in greater detail in the accompanying drawings and described below by way of examples of the invention. In the drawings.

DETAILED DESCRIPTION OF THE PREFERRED EMBODIMENT

Figure 1:
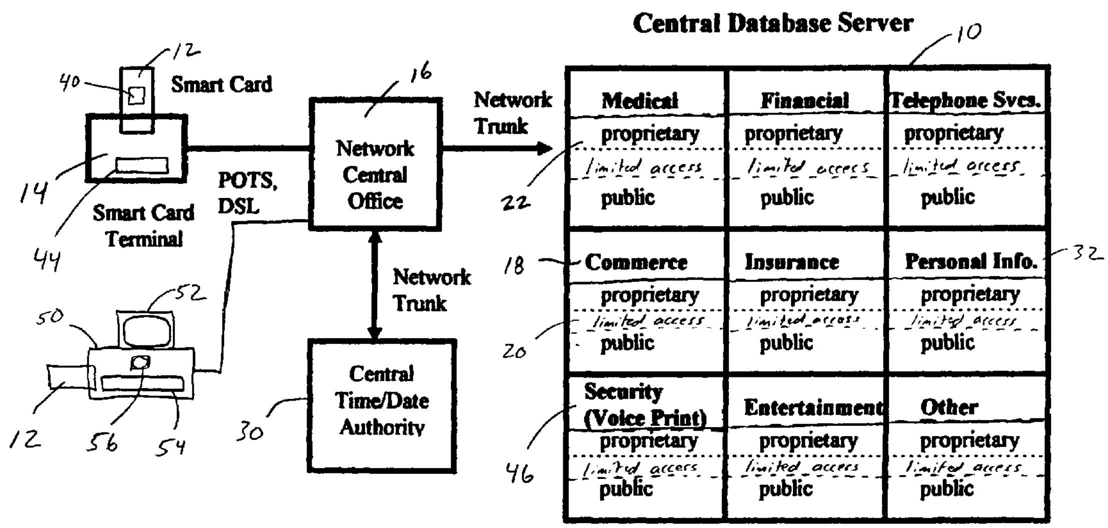
FIG. 1 is a block diagram of one embodiment of the network arrangement for smart card applications.

Referring to FIG. 1, there is shown one embodiment for a network arrangement for smart card applications in accordance with the present invention. The network arrangement makes use of a central database server 10 that supports many different smart card applications, and supports many users within a given application. A smart card 12, in combination with a smart card terminal 14, is used to access the central database server 10 through the network central office 16 of the Public-Switched Telephone Network.

The central database server 10 includes partitioned memory, described in further detail below, as well as a microprocessor for processing data received from and transmitted to the smart card terminal 14.

The central database server 10 is a centralized partitioned database server which partitions information both in terms of the smart card application as well as the accessibility of the information. The information is stored by category (medical, financial, etc.) as well as level of security (unrestricted, or public limited access, restricted). Thus, for example, in a retail purchase application 18, a merchant may require access to a user's credit information to determine whether to accept the user's credit for a particular dollar amount. This information may be partitioned in the limited access region 20 of commercial transaction applications 18.

Private or proprietary information is partitioned such that the owner of the information has control over how the information is transferred and used. Thus, for example, medical information 22 provided to a health professional may be considered private and only available by way of special authorization from the owner of the information. In this way, the owner of the information contained within the central database server has control over how the information is transferred and used.

The structure of the central database server is similar to a UNIX-based file system. Different user identification codes, or data pointers, provided by smart cards 12 allow access to partitions in the database. The information contained within the central database server is associated with the user identification codes on the smart cards 12 such that it can be classified as public information available to all the world; limited access information available to persons or selected groups with a user authentication code; or proprietary information accessible only by the owner of the information or a group with privileges to that directory information. Besides restricting others access to a smart card holder's information/data, the information or data within the server 10 can limit options available to cardholders. For example, the information owner can specify that a smart card belonging to a person or a collection of cards belonging to a group such as a family unit can be restricted in commercial transactions using the smart card to a maximum dollar value over a given time interval, or to particular merchants. Further examples of system transactions will be described with reference to FIG. 3.

Each smart card 12 used with the system provides data pointers to the relevant partitions of the central database server 10. This reduces the amount of information which must be stored or transferred to each smart card 12 and enables data to be shared across groups of cards that may be treated as a single unit. These pointers facilitates more complex applications which may otherwise require more resources than could be economically stored or transferred to the smart card 12. Thus, the network augments or replaces the amount of card memory typically associated with smart cards. This allows greater capacity than could otherwise be achieved by storing information on the cards alone.

Although the central database server 10 is shown as a single server, it is to be understood that multiple servers may comprise the central database server 10. For example, in the merchant transaction discussed above, the purchaser's credit files are more likely to be stored in a database monitored by the credit reporting companies such as TransUnion or Equifax, as opposed to the central database server 10. In such cases, the central database server 10 acts as a network smart card server which facilitates data transfer between the database containing the desired information and the merchant or person requesting the information. In the same way, insurance information would ultimately reside with the insurer, medical records with the health provider, financial records with the bank or broker, and so on. The network smart card server acts as a secured gatekeeper to such information and the smart card acts as the enabling key.

In another embodiment, a central time/date and certification authority 30 is integrated into the network arrangement to verify authenticity and timeliness of the information involved in the smart card transaction such as medical, financial, and commercial information. In addition, the central database server 10 and central time/date authority 30 can be used to provide certified personal information 32 such as digitized photograph that can be included as part of a photo identification such as a driver's license.

Smart card 12 is formed of plastic or other suitable material and contains circuitry 40 which includes a microprocessor and memory including random access memory (RAM) and read only memory (ROM). The face of the smart card 12 may have information printed or embossed on it such as a photograph, in addition to the name of the card holder. The same information can alternatively or additionally be provided in the memory contained within the card 12. The card memory also preferably includes a users "certificate" or "digital signature" as well as encryption capability for security.

FIG. 1 shows the smart card 12 interacting with a smart card terminal 14. Smart card terminal 14 is capable of reading information contained within the memory 40 of the smart card and is also capable of writing information to the smart card memory to update various records thereon. Smart card terminal 14 is connected by a data link such as the plain old telephone system (POTS) or a digital subscriber line (DSL) to the network central office 16 of the Public-Switched Telephone Network. Although only one smart card 12 and smart card terminal are shown in FIG. 1, it is to be understood that a plurality of cards 12 and terminals 14 access the central database server 10 through the network central office 16.

In operation, the smart card 12 is inserted into the smart card terminal 14 and a personal identification number (PIN) is optionally entered using an input device 44 such as a keypad, mouse, or a track ball provided on the terminal 14. A digital signature or a voice print or other security measure 46 which is stored in the central database server 10 can optionally be verified as well. The desired application is then selected which relates to a memory partition of the central database server 10 such as: medical treatment, financial transaction, telephone services, commercial transaction, insurance, personal information, security access/authorization, entertainment, or other application. Once the user's authorization has been verified, data pointers on the smart card 12 provide access to the relevant partitioned memory portions of the central database server 10. Routing circuitry controlled by the microprocessor within the central database server 10 routes the data pointer to appropriate memory locations or database of the information keeper relating to the application at issue such as medical, financial, etc. Data from these various locations is supplied back to the smart card terminal 14, and if appropriate, the data stored on the smart card 12 is updated.

Because the majority of the information is stored at a central location, namely the central database server 10, the present network arrangement allows for advance smart card terminals 50 which include a display unit 52, a keyboard 54, and a pointing device such as a track ball 56 or mouse. A smart card 12 coupled with such a terminal 50 having an established connection through the network central office 16 to the central database server 10 has the power of a typical networked computer. Smart card 12, in such a case, provides access to the authorization procedure, user profile information, and pointers to relevant data within the partitioned central database server 10.

It is contemplated that such smart card "docking stations" could transform hotel room entertainment centers or airplane seat video screens into networked computers with the insertion of a user's smart card.

Figure 2:
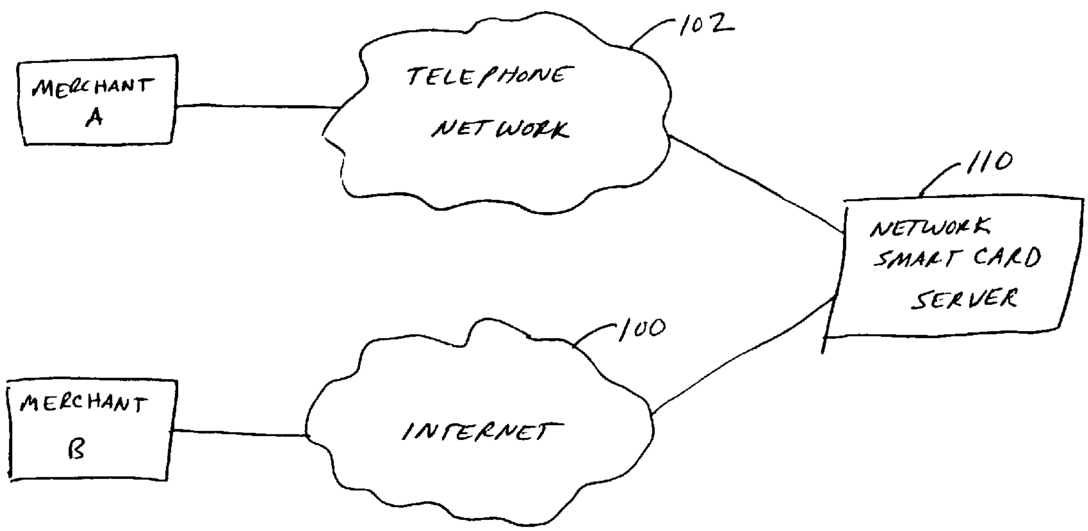
FIG. 2 is a block diagram of another embodiment of the network arrangement for smart card applications.

Referring to FIG. 2, another embodiment of the network arrangement for smart card applications is shown. In contrast to FIG. 1, the network arrangement of FIG. 2 is implemented over an interconnected network of computers such as the Internet 100 as well as or alternatively to the traditional telephone network 102. In this example, Merchant A can be identified to the network smart card server 110 via the dial-up network of the telephone network 102. For example, the "caller ID" feature of the telephone network 102 could identify the merchant to the network smart card server 110. Alternatively, the server 110 can identify the merchant, such as Merchant B, by way of a digital certificate or access code associated with the particular merchant transmitted over the Internet. The merchant record at the server 110 identifies the nature of the transaction, i.e., pharmacy, dentist/doctor, insurance, financial, travel, retail, etc. This link between the merchant and server 110 may be established at the start of each business day, at the time of the transaction, or may be continuously established until the merchant has "logged off" the system.

Figure 3:
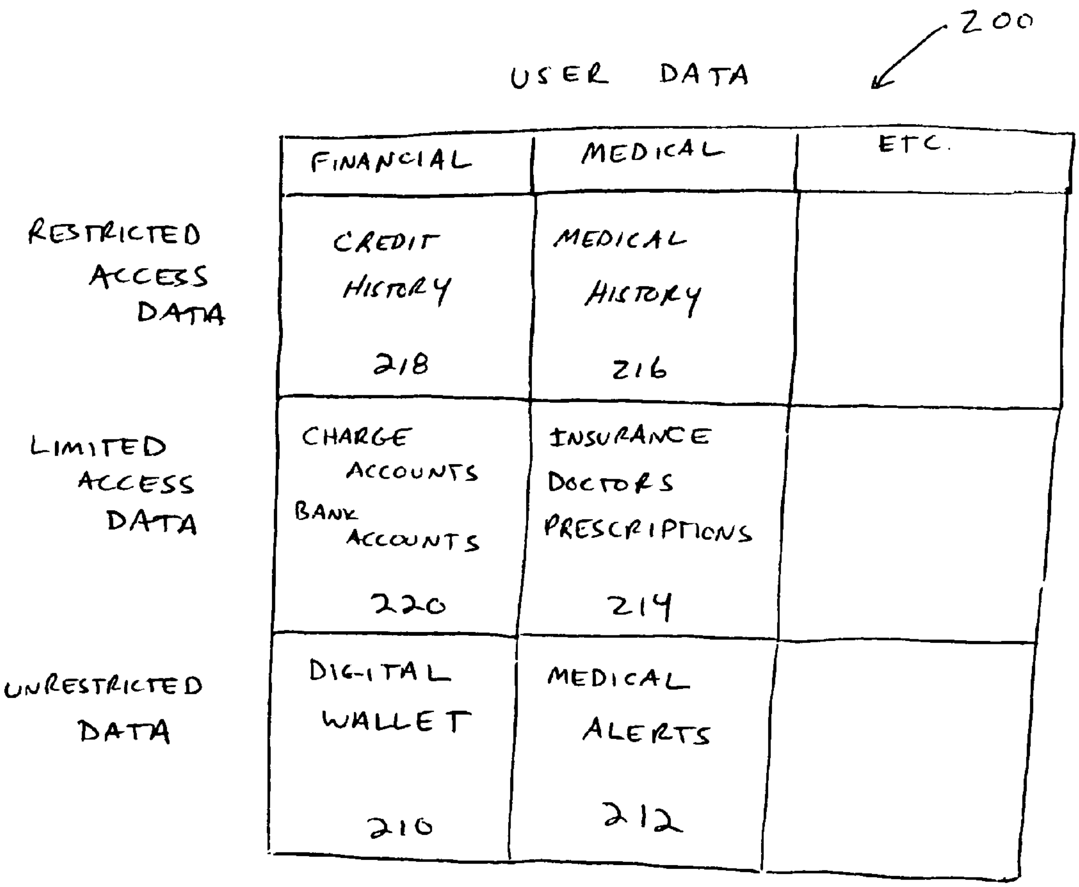
FIG. 3 is a block diagram of the central database server of FIG. 1 or 2.

FIG. 3 shows a schematic diagram of the partitioned server database of FIGS. 1 and 2. A typical network transaction will now be described with reference to FIGS. 1, 2 and 3. A user presents their smart card 12 to a merchant such as a pharmacy. The card 12 is inserted into a card terminal 14, 50 to provide authentication information to the merchant.

Preferably, the smart card provides a one-time encrypted user authentication code based on the user's digital signature or certificate. This code, in turn, is transmitted over the communication network 100, 102 along with the merchant identification code to the server 10, 110. Thus, the digital signature of the card does not change, but an authorization code generated by an encryption scheme known to the server provides a unique access code each time the card is involved in a transaction with the network.

The network server 10, 110 validates the user identification by decrypting the authorization code. This information is then cross-referenced with the merchant code to identify the information available to the merchant. The merchant can then view the information stored within the server 10, 110, upload/download information, and perform transactions which are recorded at the server 10, 110.

The merchant's access to the information is limited by time and/or number of transactions depending upon the type of merchant or nature of information. Preferably, however, the merchant would be allowed continuous access to information it has provided such as all past transactions with a certain user even after access to the user's information expires.

FIG. 3 provides one example of the type of information accessible within or through the server 200. As mentioned above, information is stored in three levels of security: unrestricted, limited access, and restricted. In the pharmacy example, once the user's authentication code and merchant code have been verified by the system, the pharmacist may have access to the user's digital wallet 210, medical alerts 212, and insurance and prescription information 214. Without further authorization, however, the pharmacy would not have access to the user's medical history 216.

Similarly, a grocer may have access to the user's digital wallet 210 and medical alerts 212 which may be necessary in the event of a medical emergency, but probably not be allowed to access any other user information.

In contrast, a loan officer at a bank or automotive dealership would be allowed to access to the user's credit history 218 as well as the user's financial account balances 220.

Data is stored in the server in several ways. Merchant profiles become populated when a merchant subscribes to the service. Default profiles can exist for merchants until a sufficient number of transactions occur through that merchant to provide network use information which may be relevant to the system. Similarly, the user data becomes populated when the user subscribes as part of the smart card activation process. Additional data is created as the user and the merchants interact with the system.

While the invention has been described in connection with one or more embodiments, it will be understood that the invention is not limited to those embodiments. On the contrary, the invention covers all alternatives, modifications, and equivalents, as may be included within the spirit and scope of the appended claims.

What is claimed is:

1. A method of providing access to information relating to an authorized user of a smart card for executing a smart card transaction, said method comprising the steps of:

providing at least one smart card terminal for receiving said smart card and communicatively interacting with the on-card memory of said smart card;

verifying authorization for a desired application that is selected at said smart card terminal for said smart card transaction;

transmitting at least an authorization code contained within said on-card memory of said smart card both through a communications network and to a network smart card server that includes a plurality of application-specific partitioned memory locations;

utilizing at least one memory-economizing data pointer provided by said authorization code to point to information relating to said authorized user that is contained in at least one of said application-specific partitioned memory locations in said network smart card server; and transmitting said information through said communications network to said smart card terminal so as to provide access to said information and also economize the information storage capacity within said on-card memory of said smart card.

2. The method of claim 1 further comprising the steps of:

modifying said information as accessed at said smart card terminal;

transmitting said information as modified to said network smart card server; and storing said information as modified in at least one of said application-specific partitioned memory locations.

3. The method of claim 1 further comprising the step of providing a central time/date value that is associated with said information as transmitted.

4. The method of claim 1 further comprising the steps of:

modifying information relating to said authorized user; and storing said information as modified on said smart card.

5. A network smart card server for use in smart card transactions, said network smart card server comprising:

a first plurality of application-specific partitioned memory locations containing information relating to an authorized user of a smart card;

a second plurality of application-specific partitioned memory locations containing further information relating to said authorized user; and a microprocessor programmed to receive an authorization code contained within the on-card memory of said smart card, said authorization code representing at least one memory-economizing data pointer for pointing to authorized user related information contained within at least one memory location within said first plurality or said second plurality of application-specific partitioned memory locations so as to provide access to said authorized user related information and also economize the information storage capacity within said on-card memory of said smart card.

6. The network smart card server of claim 5 wherein said information contained in said first plurality of application-specific partitioned memory locations is access-designated public data for said smart card transactions.

7. The network smart card server of claim 6 wherein said information contained in said second plurality of application-specific partitioned memory locations is access-designated restricted data for said smart card transactions.

8. The network smart card server of claim 5 wherein each of said first plurality and said second plurality of application-specific partitioned memory locations contains information designated for at least one smart card application.

9. The network smart card server of claim 5 wherein at least one of said first plurality of application-specific partitioned memory locations is located on a separate database server accessible through a communications network.

10. The network smart card server of claim 9 wherein said communications network includes the Internet.

11. The network smart card server of claim 9 wherein said communications network includes a public-switched telephone network.

* * * * *